United States Patent [19]
Siener, Jr. et al.

[11] Patent Number: 5,655,324
[45] Date of Patent: Aug. 12, 1997

[54] SIGN AND SHEET MATERIAL USEFUL THEREIN

[75] Inventors: Philip R. Siener, Jr., Greene; Peter H. Scott, Barrington, both of R.I.

[73] Assignee: Cooley, Incorporated, Pawtucket, R.I.

[21] Appl. No.: 322,590

[22] Filed: Oct. 13, 1994

Related U.S. Application Data

[60] Continuation-in-part of Ser. No. 96,472, Jul. 22, 1993, Pat. No. 5,529,835, which is a division of Ser. No. 659,880, Feb. 22, 1991, Pat. No. 5,271,992.

[51] Int. Cl.⁶ ........................................... G09F 19/00
[52] U.S. Cl. .................. 40/615; 40/584; 40/606; 428/212; 428/217; 442/312; 442/313
[58] Field of Search ..................... 428/253, 254, 428/257, 212, 217; 40/584, 606, 615; 442/312, 313

[56] References Cited

U.S. PATENT DOCUMENTS

| | | | |
|---|---|---|---|
| 4,443,516 | 4/1984 | Rogers | 428/254 |
| 4,468,422 | 8/1984 | Seiner, Jr. et al. | |
| 4,615,934 | 10/1986 | Ellison | 428/254 |
| 5,271,992 | 12/1993 | Siener, Jr. et al. | |
| 5,529,835 | 6/1996 | Siener, Jr. et al. | |

*Primary Examiner*—James J. Bell

[57] ABSTRACT

Signs which include a sheet including plastic stiff enough to resist fracture and flexible enough to maintain surface flatness in use without being put under tension, and such sheets.

11 Claims, 1 Drawing Sheet

U.S. Patent  Aug. 12, 1997  5,655,324
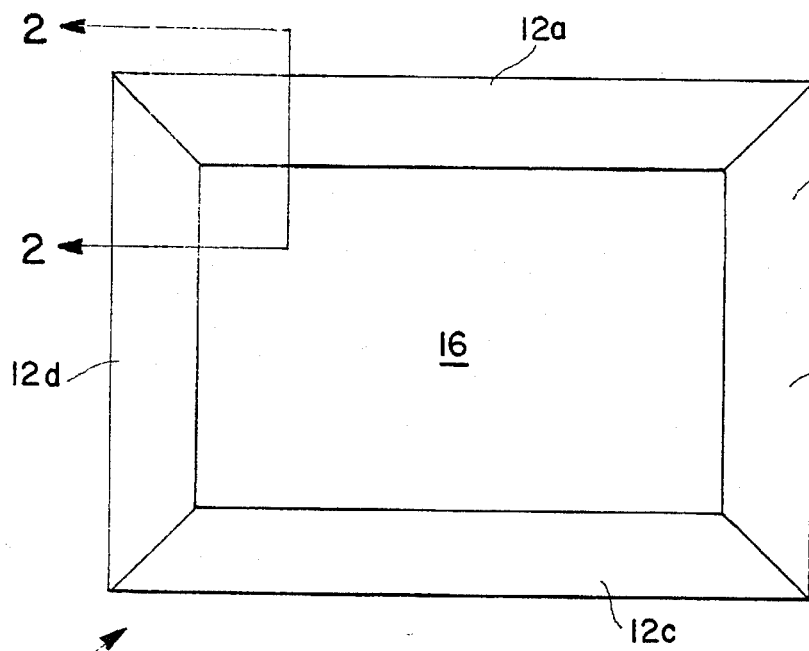
FIG. 1
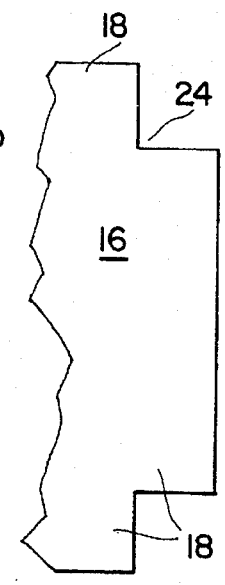
FIG. 3
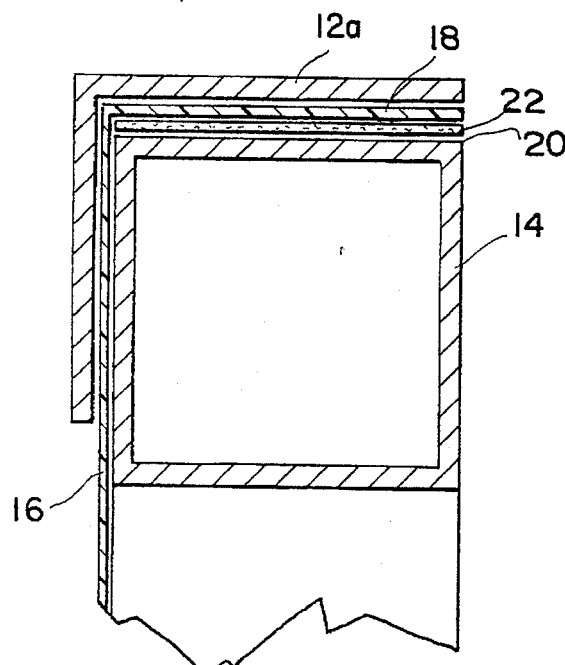
FIG. 2
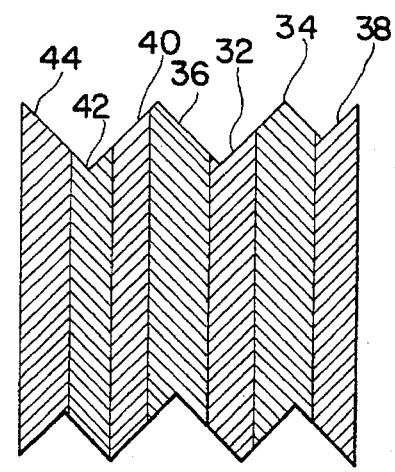
FIG. 4
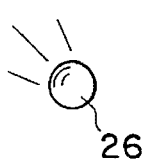

5,655,324

SIGN AND SHEET MATERIAL USEFUL THEREIN

This is a CIP of 08/096,472 filed Jul. 22, 1993 now U.S. Pat. No. 5,529,835 which is a div of Ser. No. 07/659,880 filed Feb. 22, 1991 now U.S. Pat. No. 5,271,992.

FIELD

This invention relates to sheet material useful in making signs and to signs made from such material.

BACKGROUND

Illuminated prior art signs have included indicia-bearing rigid sheets of plastic three-sixteenths to one-half inch thick; which neither included a fabric layer nor could withstand a very large bend without fracture.

Illuminated signs featuring a thin, flexible, translucent, fabric-reinforced plastic sheet carrying indicia such as letters of contrasting color and incorporating barrier layers over the plastic coatings and under the letters are taught in our U.S. Pat. No. 5,271,992, "Laminar Sheet Construction", granted Dec. 21, 1993, and pending divisional application Ser. No. 08/096,472, "Laminar Sheet Construction", filed Jul. 22, 1993. These signs required tensioning elements built into frames for the sheet to keep the sheet pulled free of buckling, wrinkling, or other surfaces deformation.

SUMMARY

Our conception is that improved signs may be provided by placing indicia on primarily plastic sheets of intermediate flexibility, stiff enough not to be distorted in use, even though not held in special tensioning elements, yet flexible enough to resist fracturing in use.

In preferred embodiments, the sheet is at 68 degrees F. flexible enough robe wrapped 180 degrees around a two-inch diameter cylindrical spindle without breaking or preventing its return to smooth, planar-surfaced condition, yet stiff enough so that in use the planar-surfaced condition continues (without for example buckling, corrugating, or dimpling) despite mounting in a simple frame free of special tensioning elements; the sheet is of plastic centrally reinforced by a layer of fabric; the indicia are integral with the plastic and created by differential solution of portions of a differently colored second plastic layer over the first, a third plastic layer is interposed between the first and the second as a barrier layer; and in a sign the overall sheet is held on an inner metal frame by double-sided pressure-sensitive adhesive tape and an outer metal frame thereover.

PREFERRED EMBODIMENT

We turn now to a preferred embodiment of the invention, describing its structure as in the attached drawings and operation.

FIG. 1 is a front elevation of a sign.

FIG. 2 is a sectional view at 2—2 of FIG. 1.

FIG. 3 is a broken-away, developed, front elevation of a novel sheet of the invention.

FIG. 4 is a diagrammatic partial sectional view of said sheet.

There is indicated generally at 10 an illuminated (light housing not shown) sign with extruded aluminum frame 12 with four panels 12a, 12b, 12c, and 12d, L-shaped in section (FIG. 2) and abuttingly connected to form the frame. Secured against inner frame-like support 14, of extruded aluminum square-tubular in cross-section and also with four panels cut with 45 degree ends and abuttingly joined just as are frame panels 12a–d, to form support 14, is translucent sheet 16. Four tabs 18 are bent over perpendicularly from the face of sheet 16 to underlie respectively the inner portions of four panels of frame 12. Each tab 18 is of length and width to overlie the adjoining surface 20 of support 14. Intermediate tab 18 and surface 20 is a strip 22 of pressure-sensitive adhesive tape, both sides so adhesive, abutting full adjacent surfaces 20 and of tab 18.

Each of the four panels 12a–d overlies a corresponding support portion and holds between itself and the corresponding support portion a correspondingly related double-faced length of adhesive tape 22 and sheet tab 18. Square notches 24 in the four corners of sheet 16 define the four tabs 18 and permit the bending over of those tabs.

Sign 10 is illuminated by lamp 26.

There is shown in FIG. 4 a sheet 16 with a central portion 32, 34, 36 shown diagrammatically as three layers, although fabric portion 32 is in fact embedded in plastic layers 34, 36.

Fabric element 32 is of weft insertion process (a process generally disclosed in Siener, Jr. et al. U.S. Pat. No. 4,468, 422, "Material Useful as Roofing", granted Aug. 28, 1984). A fabric made by a weft insertion process has warp and weft threads that bear simple overlying relationships (not interwoven) and a third set of strands tying together warp and woof. Element 32 has extending in a warp direction (the long or longitudinal dimension of the layer, which is initially 84 inches in its other, width, or transverse, or weft, direction) 3-ply (twisted about one another with one and a half turns per inch) warp twists, each ply being of 200 denier continuous filament high tenacity polyester heat set at 350 degrees F., there being 18 such 3-ply warp twists per inch of layer 32 in a transverse direction.

Extending in a transverse direction in layer 32 are weft continuous filaments of high tenacity polyester, 500 denier, heat set at 350 degrees F., 20 filaments per longitudinal inch.

By "high tenacity" is meant that breaking occurs under tension at about six grams per denier (i.e., at about 3000 grams for a 500 denier filament).

The warp twists and woof filaments above described are not interwoven, but rather extend each in general in loci in which the axis of each warp twist is in one plane and the axes of the weft filaments are in another plane, the planes being spaced as closely as practical to each other. The warp twists and filling (woof) filaments are held together by knitting yarn, 70 denier continuous filament polyester heat set at 350 degrees F., in a tricot stitch.

The fabric 32 is made resistant to wicking by treatment of the fabric from which it is made with a chemical suitable for the purpose.

Layers 34, 36 are of thermoplastic material, a mixture of (by weight) 60 percent Geon EA29 (trademark and designation of the B. F. Goodrich Company, Akron, Ohio) and 40 percent Geon EA14 (trademark and designation of the same company), providing a translucent polyvinyl chloride formulation.

Layers 34, 36 are each of thickness of 0.008 inches, and the overall thickness of portion 32, 34, 36 is 0.016, the fabric portion 32 not contributing significantly to thickness.

Barrier layer 38 is 0.015 inches in thickness and is of an impact modified acrylic copolymer sold by Imperial Chemical Industries, of Great Britain, under their mark and designation Perspex CP-1000E.

Barrier layer 40 is adhered to layer 36 and is constituted of a plastic composition consisting of (by weight) 98.5 parts acrylic resin sold by Rohm & Haas under the name PRD-32; 0.5 parts 2(2'-hydroxy-5'-methylphenyl) benzotriazole sold by Ciba-Geigy under the name Tinuvin P (an ultraviolet stabilizer); and 1.0 part octadecyl 3,5-di-tert-butyl-4-hydroxy hydrocinnamate (an antioxidant). Layer 40 is 0.002 inches in thickness.

In manufacturing the preferred embodiment, layer 34 is first extruded onto fabric 32. Layer 36 is then extruded onto the other side of the fabric. Layer 40 is then applied to layer 36.

Pigmented layer 42 is then deposited over barrier layer by the rotary screen printing process, in which a stationary squeegee forces liquid through the metering holes of a rotating screen defining with a counter pressure roll a nip.

Pigmented translucent layer 42 is adhered to barrier layer 40 and is formulated as follows (parts by weight):

| Elvacite 2014 | 24.7% |
|---|---|
| Neocryl B734 | 13.3% |
| Propylene Glycol Monomethylether Acetate | 33.0% |
| Ethylene Glycol Monobutylether Acetate | 18.0% |
| Defoamer AF9000 | 0.5% |
| Cyasorb UV5411 | 0.5% |
| Phthalocyan Pigment | 10.0% |
| | 100.0% |

Elvacite 2014 is a methyl methacrylate polymer sold under that designation by DuPont. Neocryl B734 is an acrylic polymer sold under that designation by ICI. Defoamer AF 9000 is a dimethyl silicone antifoam sold under that designation by General Electric. Cyasorb UV 5411 is a 2-(2-Hydroxy-5-Tert-Octyl Phenyl) Benzotriazole product sold under that designation by American Cyanamid. The phthalocyan pigment is a chlorinated copper phthalocyanine, pigment blue 1513, color index number 74160, sold under that designation by Mobay.

Pigmented layer 42 is two microns in thickness.

Adherent to pigmented layer 42 and next deposited is transparent barrier layer 44, which has the following formulation (parts by weight):

| Polymethylacrylate | 25.0 |
|---|---|
| Toluene | 62.5 |
| Multiflow | 2.0 |
| Dibasic Ester | 10.0 |
| Cyasorb UV5411 | 0.5 |
| | 100.0 |

Barrier layer 44 is 10 microns in thickness. Multiflow is a copolymer of ethyl acrylate and 2-ethyl-hexyl acrylate, in xylene solution, sold under the specified designation by Monsanto. Dibasic ester is a blend of dimethyl esters of succinic, glutaric, and adipic acid, sold under that designation by DuPont.

Finally is extruded onto barrier layer 34, which also supplies the needed added stiffness for the invention, at 430 degrees F., barrier layer 38.

The barrier layers protect against weathering and dirt and other environmental sources of contamination, as well as in certain instances against undesired outward migration of formulation components, such as plasticizers, to lengthen adhesive life of both pigmented and pressure-sensitive layers.

Signs of the preferred embodiment, in which sheet 16 is translucent, may suitably be made by selectively removing, in a stencil way, portions of the removable layers 44 and 42, using with the layers described a 35:65 acetone:methylene chloride mixture.

Signs both very large and very small may be made using the invention. Ability to prepare the latter without the need for including elements with the sole function of providing tension to the plastic sheet is of great value.

Other Embodiments

Other embodiments of the invention are numerous. Layers may be of various materials and thickness. Certain layers may be omitted, as layer 40, to save expense. Two of the thicker barrier layers may be used, the second as barrier 40. The sum of the thicknesses of layers 38, 40 may be from 0.004 inches through 0.030 inches, other layers being as specified in the preferred embodiment. Mounting means may be varied, as by using double-sided pressure sensitive tape on less than four sides of a frame, or for example mounting with fasteners on an upper edge. In some embodiments the fabric element may be omitted; and the sheet may not be translucent.

Related

This is a continuation in part of U.S. Ser. No. 08/096,472, "Laminar Sheet Construction", filed Jul. 22, 1993 by Philip R. Siener, Jr., and Peter H. Scott, which was a division of U.S. Pat. No. 5,271,992, granted Dec. 21, 1993, which patent and application are hereby incorporated by reference.

We claim:

1. A sign comprising a sheet comprising plastic,
said sheet being sufficiently flexible at 68 degrees F. to be wrapped 180 degrees around two-inch diameter cylindrical spindle without breaking or preventing its return to smooth, planar-surfaced condition while stiff enough so that in use said condition exists without regard to whether said sheet is in tension, and
said sheet including a fabric layer, and a mount for said sheet.

2. The sign of claim 1 in which said fabric layer is weft-inserted.

3. The sign of claim 2 in which said fabric layer is embedded in first plastic material.

4. The sign of claim 3 in which said first plastic material includes thereover a layer of second plastic material
said layer of second plastic material conducing to said stiffness.

5. The sign of claim 4 in which said first plastic material includes thereover a second layer of plastic material, said second layer being a barrier layer.

6. The sign of claim 5 in which said second layer has thereover a third layer differentially soluble with respect thereto.

7. The sign of claim 1 in which
fabric layer is embedded in said plastic,
said sheet being flexible enough to prevent fracture in ordinary use but stiff enough to maintain flatness in said use without regard to whether in tension.

8. The sign of claim 7 in which said sheet may be wrapped 180 degrees around a two-inch spindle at 68 degrees F. without breaking or preventing its return to smooth, planar-faced condition.

9. The sheet of claim 8 which includes at least two layers of two different plastics, one of said layers being chosen for its stiffening characteristics.

10. The sheet of claim 9 which is translucent.

11. The sheet of claim 1 which includes an outer layer differentially soluble with respect to an underlying layer of different color.

* * * * *

UNITED STATES PATENT AND TRADEMARK OFFICE
CERTIFICATE OF CORRECTION

PATENT NO.   : 5,655,324
DATED        : August 12, 1997
INVENTOR(S)  : Philip R. Siener, Jr. and Peter H. Scott It is certified that error appears in the above-indentified patent and that said Letters Patent is hereby corrected as shown below:

Col. 1, line 14, the ";" after "thick" should be --,--;

line 35, "robe" should be --to be--;

line 40, the "," after "despite" should be a space;

Col. 3, line 5, after "layer" should be --40--;

Col. 4, line 41, after "material" should be --,--; and line 63, "1" should be --10--.

Signed and Sealed this

Third Day of February, 1998

Attest:

BRUCE LEHMAN

Attesting Officer

Commissioner of Patents and Trademarks